United States Patent [19]

Fitzgibbon

[11] Patent Number: 5,310,138
[45] Date of Patent: May 10, 1994

[54] WING FOLD ACTUATOR SYSTEM FOR AIRCRAFT

[75] Inventor: Thomas F. Fitzgibbon, Long Beach, Calif.

[73] Assignee: AlliedSignal Inc., Morris Township, Morris County, N.J.

[21] Appl. No.: 816,315

[22] Filed: Dec. 30, 1991

[51] Int. Cl.⁵ .................................................. B64C 3/56
[52] U.S. Cl. ...................................... 244/49; 74/665 Q
[58] Field of Search ................................ 244/49, 75 R; 74/424.8 R, 89.15, 661, 479; 192/8 R, 144; 292/144, 142, 172

[56] References Cited

U.S. PATENT DOCUMENTS

| | | | |
|---|---|---|---|
| 2,166,564 | 7/1939 | Atwood et al. | 244/49 |
| 2,289,224 | 7/1942 | Swanson et al. | 244/49 |
| 2,620,683 | 12/1952 | Geyer | 74/665 Q |
| 2,719,682 | 10/1955 | Handel | 244/49 |
| 2,776,577 | 1/1957 | Olchawa | 74/424.8 R |
| 4,137,784 | 2/1979 | Griffin | 74/89.15 |
| 4,289,996 | 9/1981 | Barnes et al. | 318/38 |
| 4,295,384 | 10/1981 | Brandt et al. | 74/424.8 NA |
| 4,426,911 | 1/1984 | Robinson et al. | 244/75 R |
| 4,431,149 | 2/1984 | Brislawn et al. | 244/75 R |
| 4,497,461 | 2/1985 | Campbell | 244/75 R |
| 4,498,647 | 2/1985 | Boehringer et al. | 244/75 R |
| 4,603,594 | 8/1986 | Grimm | 74/89.15 |
| 4,633,984 | 1/1987 | Hudson | 244/75 R |
| 4,637,272 | 1/1987 | Teske et al. | 244/75 R |
| 4,691,880 | 9/1987 | Frank | 244/49 |
| 4,745,815 | 5/1988 | Klopfenstein | 74/424.8 R |
| 4,773,620 | 9/1988 | Seidel | 244/75 R |
| 4,876,906 | 10/1989 | Jones | 74/89.15 |
| 4,962,902 | 10/1990 | Fortes | 244/75 R |
| 5,028,828 | 7/1991 | Felkai et al. | 244/75 R |

FOREIGN PATENT DOCUMENTS

| | | | |
|---|---|---|---|
| 693921 | 9/1964 | Canada | 244/49 |
| 903430 | 10/1945 | France | 244/49 |

Primary Examiner—Michael S. Huppert
Assistant Examiner—Anne E. Bidwell
Attorney, Agent, or Firm—Robert A. Walsh; Joseph R. Black

[57] ABSTRACT

An improved actuator system is provided for safe displacement of a folding wing section of an aircraft between a folded storage position and a deployed position for normal flight operations. The actuator system comprises an electrohydraulic actuator forming part of a mechanical linkage between an outboard folding wing section and an adjacent inboard wing section. The electrohydraulic actuator is adapted to be reversibly driven either electrically or hydraulically to displace the outboard wing section, and includes an improved brake unit for automatically retaining the outboard wing section in place upon interruption of drive power input to the actuator. The actuator system further includes an improved latch pin unit adapted for electric or hydraulic powered operation to positively lock the outboard wing section in the deployed position.

14 Claims, 8 Drawing Sheets

WING FOLD ACTUATOR SYSTEM FOR AIRCRAFT

BACKGROUND OF THE INVENTION

This invention relates generally to power drive mechanisms for controlled and safe displacement of a folding wing section in an aircraft. More particularly, this invention relates to an improved wing fold actuator system designed for safe, fully reversible operation in response to alternative electrical or hydraulic power drive input. In addition, this invention relates to an improved latch pin unit for securely locking a folding wing section of an aircraft in a deployed position for normal flight operation.

Aircraft equipped with folding wing sections are generally known in the art, wherein an outboard wing section is hingedly connected to a fixed inboard wing section to permit pivoting movement between a generally horizontal deployed position for normal flight operations and a generally upright or vertical folded storage position. Such aircraft normally include a power driven actuator system for displacing the outboard wing section between the deployed and folded positions, in combination with one or more latch pins or similar lock devices for positively retaining the outboard wing section in the deployed condition during flight operations. In the past, the actuator mechanism has typically comprised an hydraulically powered mechanism designed for relatively rapid wing section displacement when the main hydraulic system of the aircraft is operational. However, hydraulic actuator systems have not provided satisfactory means for locking a folded or partially folded wing section in place in the event of hydraulic power interruption, such that the folded or partially folded wing section may fall uncontrollably to the deployed position thus creating a significant risk of injury to nearby personnel. Moreover, with hydraulically powered actuator systems, it has been necessary to provide an alternative hydraulic power source or other power drive apparatus to displace the folding wing section when the main hydraulic system of the aircraft is not operational.

Improved wing fold actuator systems have been proposed for displacing a folding wing section of an aircraft in response to alternative electrical or hydraulic power input. Such proposed systems have been intended primarily to facilitate wing section displacement in response to electrical power input when the main hydraulic system of the aircraft is nonoperational. Although electric drive actuator mechanisms generally displace the folding wing section at a relatively slow rate in comparison with an hydraulic drive mechanism, the capability for electric drive wing section displacement is highly beneficial when an hydraulic power source is inconvenient or unavailable. However, these dual drive actuator systems have tended to be relatively complex in terms of construction and operation, and further have not satisfactorily provided a simple and lightweight yet mechanically effective brake apparatus for locking the folding wing section in place in the event of power input interruption.

In addition, wing fold actuator systems in the prior art have frequently encountered unreliable operation of the latch pin or other lock device used to positively lock the folding wing section in the deployed position. That is, the latch pin or lock device has normally included an extensible latch component mounted on one of the adjacent inboard and outboard sections, and adapted to fit with relatively close tolerance through a lock port formed in a structural component on the other wing section. Secure engagement of the latch component within the lock port, with minimal freedom of movement, is essential for safe flight operations. Unfortunately, minor mechanical misalignment can result in incomplete engagement or nonengagement of the latch component such that proper wing section locking does not occur. Alternately, such mechanical misalignment can cause an engaged latch component to stick or bind in a locked position, thereby preventing wing section folding to the storage position.

The present invention overcomes the problems and disadvantages encountered in the prior art by providing an improved wing fold actuator system adapted for alternative electric or hydraulic power drive input, in combination with an improved brake unit for locking a folding wing section in place in the event of input power interruption. Moreover, the improved actuator system provides an improved latch pin unit having an extensible latch pin designed for reliable operation to lock and unlock the folding wing section.

SUMMARY OF THE INVENTION

In accordance with the invention, an improved wing fold actuator system is provided for power drive pivoting movement of a folding wing section of an aircraft. The actuator system includes an electrohydraulic actuator designed for alternative electric or hydraulic power drive input to displace a folding outboard wing section reversibly between a generally horizontal deployed position for normal flight operations, and a generally vertical folded position for storage purposes. The electrohydraulic actuator includes an improved brake unit for securely locking the folding wing section in place in the event of input power interruption. In addition, the actuator system includes at least one improved latch pin unit for positively locking the folding wing section in the deployed position for flight operations.

The electrohydraulic actuator comprises a portion of a mechanical linkage connected between adjacent inboard and outboard wing sections of an aircraft. The actuator includes an extensible ram adapted to be reversibly driven to pivot the outboard wing section between the deployed and folded positions. The preferred actuator comprises a ball nut and screw assembly having a drive piston mounted within a power cylinder and adapted to extend and retract the ram upon appropriate supply of hydraulic fluid under pressure to the power cylinder. The ball nut and screw assembly is additionally connected through a reduction gear train to the output shaft of an electric drive motor for reversibly extending an retracting the ram upon drive motor operation.

The improved brake unit includes one or more brake disks carried on the output shaft of the drive motor and normally locked against rotation by associated nonrotational friction rings. The brake unit is designed to retract the friction rings from the brake disks and thereby permit rotation of the motor drive shaft in response to drive motor operation, or alternately in response to supply of hydraulic fluid under pressure to the power cylinder. Upon interruption of either power input source, the brake unit automatically reengages the friction rings with the brake disks to halt rotation of the drive motor output shaft, and thereby also lock the ball nut and screw assembly against further ram displacement. As a result, when the power input source is interrupted, the automatic reengagement of the brake unit effectively locks the folding wing section in place.

At least one of the improved latch pin units is mounted on one of the adjacent inboard and outboard wing sections, for releasibly engaging an associated lock port formed in a structural component of the adjacent wing section. When the outboard wing section is in the deployed position, the latch pin unit is driven electrically or hydraulically to extend a latch pin into the lock port and thereby securely lock the wing sections together for flight operations. In one preferred form, latch pin extension is accompanied by diametric expansion for secure engagement within the lock port, without binding or misalignment. In another preferred form, the latch pin is designed for rotating movement concurrently with pin extension or retraction, to facilitate latch pin engagement and disengagement without binding.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
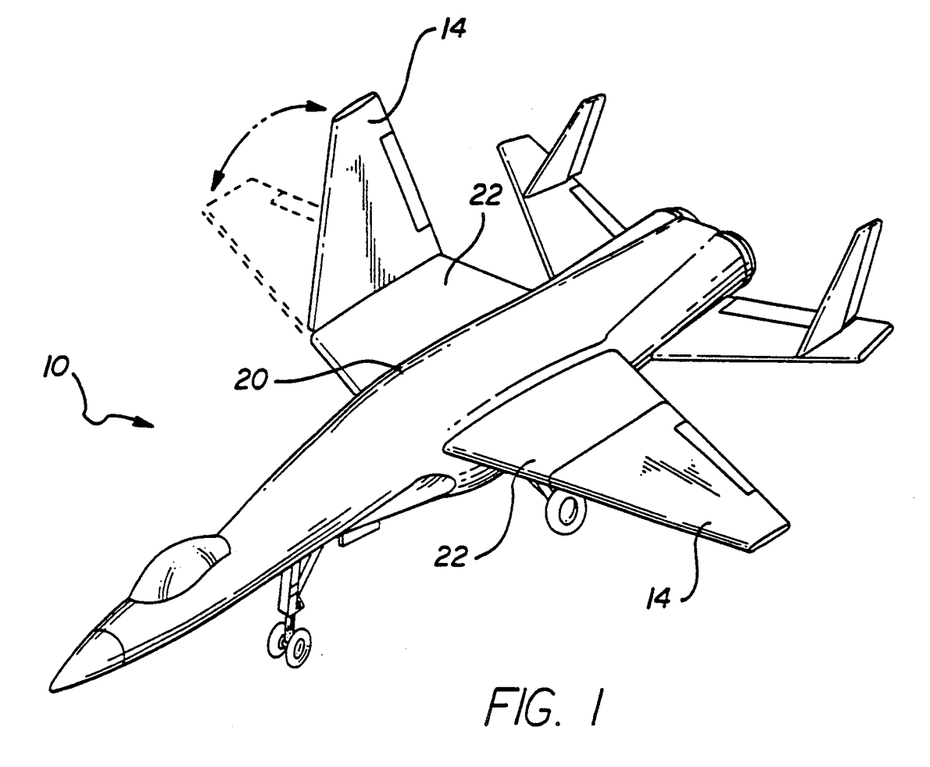
FIG. 1 is a perspective view illustrating an exemplary aircraft adapted to include the improved wing fold actuator system embodying the novel features of the invention.

As shown in the exemplary drawings, an aircraft referred to generally in FIG. 1 by the reference numeral 10 includes an improved wing fold actuator system 12 (FIG. 2) for controlled and safe displacement of a folding wing section 14 between a normal deployed position for flight operations, and an upright or generally vertical folded position for storage. As viewed in FIG. 2, the wing fold actuator system includes electrohydraulic actuators 16 for mechanically pivoting the folding wing section 14 between the deployed and folded positions, in combination with a plurality of latch pin units 18 for mechanically locking the folding wing section in the deployed position.

FIG. 1 illustrates the aircraft 10 to include a fuselage 20 with a primary wing structure projecting laterally outwardly from opposite sides thereof. At each side of the fuselage, this primary wing structure defines an inboard wing section 22 which is connected at an outer edge thereof to the folding or outboard wing section 14. As is known in the art with respect to folding wing aircraft, the outboard wing sections 14 at each side of the fuselage are adapted for pivoting movement between a generally horizontal extended or deployed position for normal flight operations, and an upright folded or storage position to reduce the aircraft wing span. In this regard, while FIG. 1 illustrates an exemplary folding wing aircraft of a type which may be used for military operations, it will be understood that the invention is applicable to folding wing aircraft of any type, such as commercial passenger and/or private aircraft and the like equipped with folding wing structures.

Figure 2:
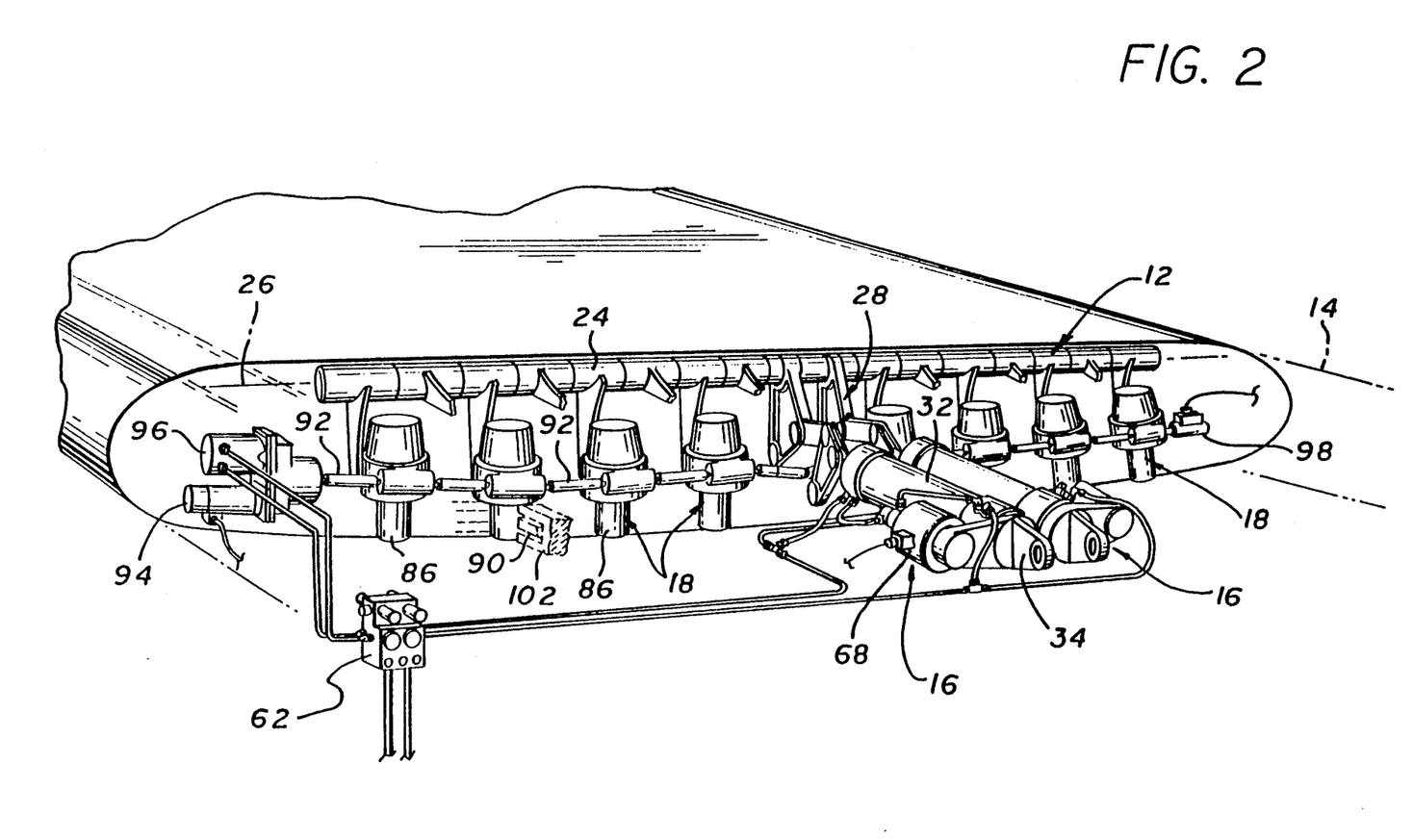
FIG. 2 is an enlarged fragmented and somewhat diagrammatic view illustrating the wing fold actuator system of the present invention.
Figure 3:
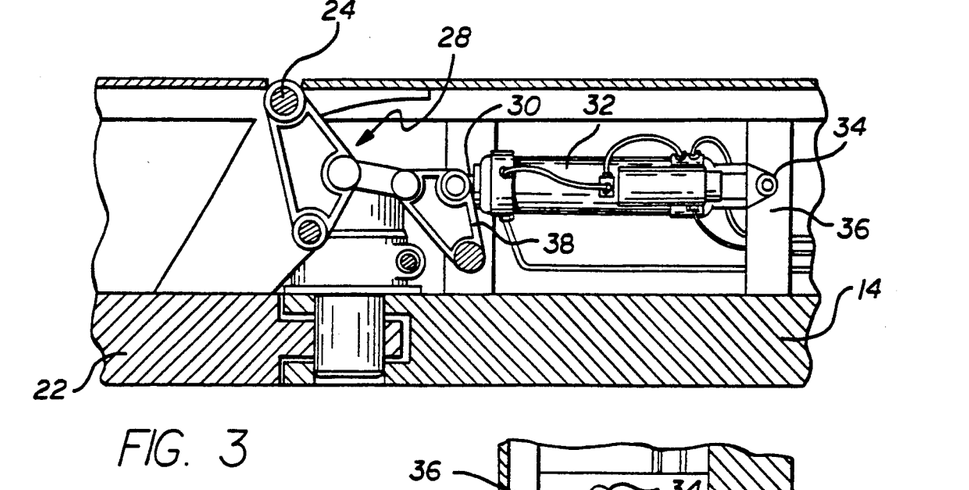
FIG. 3 is a fragmented vertical sectional view illustrating adjacent inboard and outboard wing sections locked in a deployed position for normal flight operations.
Figure 4:
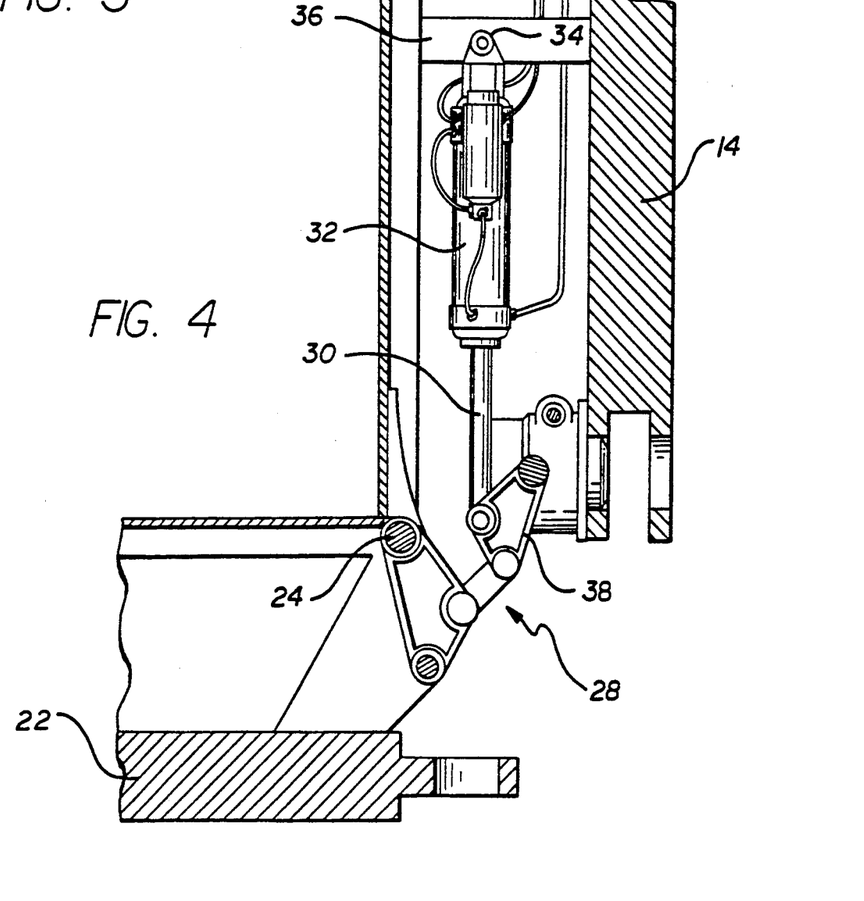
FIG. 4 is a fragmented sectional view similar to FIG. 3, but depicting the outboard wing section in a folded storage position.

In general terms, as viewed in FIGS. 2-4, the folding or outboard wing section 14 at either side of the aircraft is connected to the adjacent inboard wing section 22 by a suitable hinge assembly 24. The hinge assembly 24 defines a pivot axis 26 (FIG. 2) running generally in a fore-aft direction at a position between the adjacent wing sections 14 and 22, and near the upper surfaces of the wing sections. A mechanical linkage 28 is connected between the adjacent wing sections 14 and 22 to a accommodate pivoting motion of the outboard wing section 14 between the deployed position (FIGS. 2 and 3) and the folded position (FIG. 4). The electrohydraulic actuators 16 comprise an integral portion of this mechanical linkage 28 to obtain power driven pivoting movement of the outboard wing section 14. As shown in FIG. 2, in a preferred system arrangement, the mechanical linkage 28 includes redundant components, inclusive of a parallel mounted pair of the electrohydraulic actuators 16, to ensure reliable actuator system operation.

Each electrohydraulic actuator 16 is designed to operate in response to alternative power drive inputs to extend or retract a ram 30. As shown in FIGS. 3 and 4, the ram 30 projects from one end of a power cylinder 32 which is suitably anchored at a base 34 to a structural component 36 of the outboard wing section 14. A free end of the ram 30 is pivotally connected to a link 38 of the mechanical linkage 28 to obtain controlled pivoting displacement of the outboard wing section. In the preferred form and utilizing the specific mechanical linkage 28 shown in the exemplary drawings, extension of the ram 30 functions to pivot the outboard wing section to the upright folded position, whereas retraction of the ram 30 into the power cylinder 32 pivots the wing section 14 to the deployed position.

Figure 5:
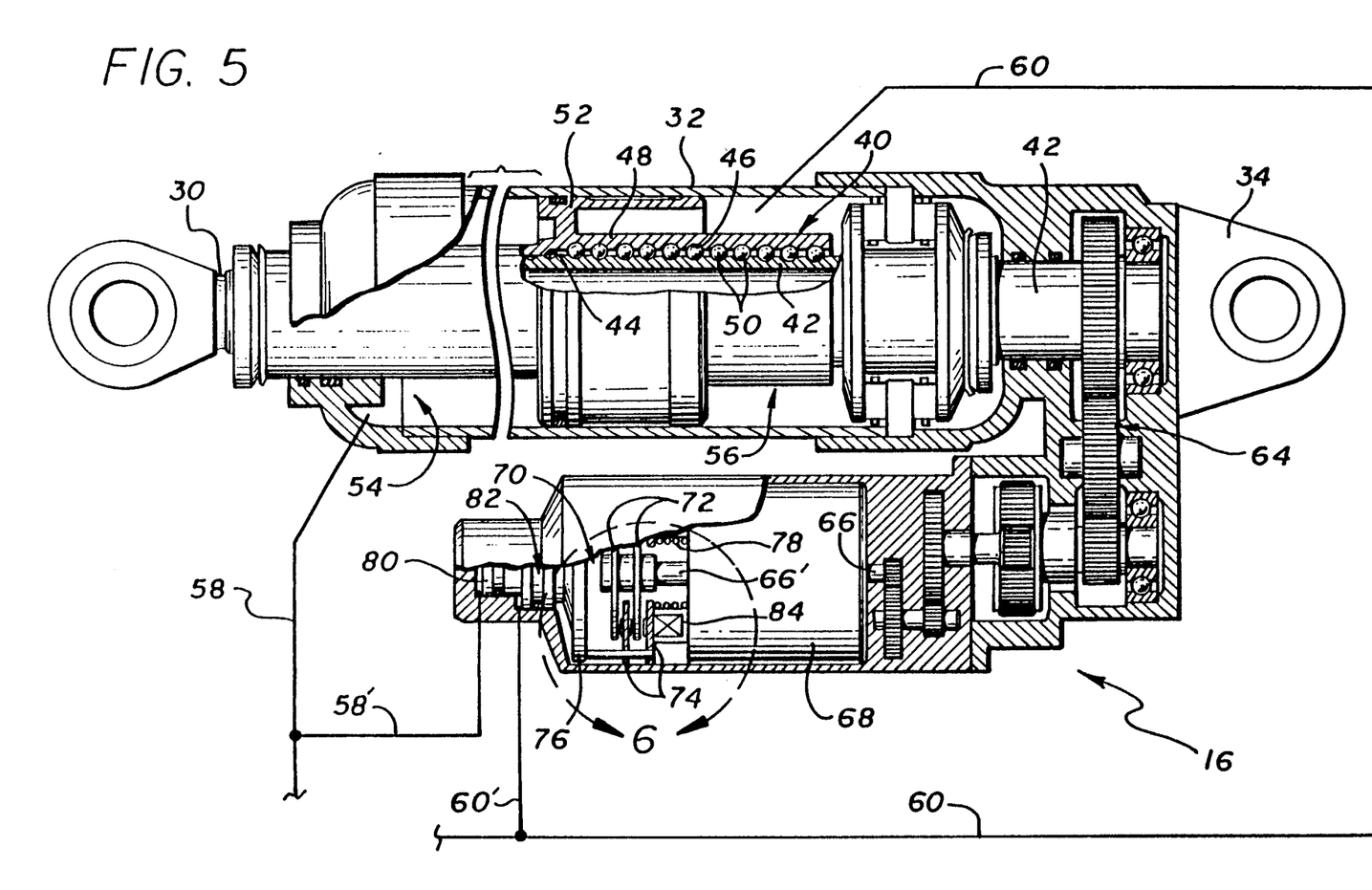
FIG. 5 is an enlarged fragmented and somewhat schematic plan view of an electrohydraulic actuator for use in displacing the outboard wing section between the deployed and folded positions, with a brake unit in a disengaged position.

As shown in FIG. 5, each electrohydraulic actuator 16 includes a ball nut and screw assembly 40 mounted within the power cylinder 32. This ball nut and screw assembly 40 comprises a conventional ball screw jack having a central drive shaft 42 mounted for rotation coaxially within the power cylinder 32. A spiral ball track 44 on the exterior of the drive shaft 42 cooperates with a mating ball track 46 on the interior of a cylindrical nut member 48 to capture and retain an array of ball bearings 50, all in a manner conventional with ball screw jacks known in the art. The nut member 48 is connected to one end of the ram 30 which projects outwardly from the power cylinder 32.

The nut member 48 of the ball nut and screw assembly 40 additionally includes a power piston 52 which divides the interior of the power cylinder 32 into a pair of separated fluid chambers 54 and 56. Hydraulic conduits 58 and 60 shown schematically in FIG. 5 are provided for delivering hydraulic fluid under pressure to one of the chambers 54 and 56, and exhausting the other chamber, in accordance with operation of a multiport control valve 62 (FIG. 2). With reference to FIG. 5, supply of hydraulic fluid under pressure to the chamber 56 causes the power piston to move in a direction extending the ram 30, whereas supply of pressurized hydraulic fluid to the other chamber 54 causes the power piston 50 to retract the ram 30. In this manner, reversible or bidirectional driving of the actuator 16 in response to hydraulic pressure is obtained. During normal operation, the pressurized hydraulic fluid may be obtained from a main hydraulic system on the aircraft 10, although a supplemental source of hydraulic fluid under pressure may be obtained from auxiliary equipment on the ground.

Translation of the power piston 52 within the cylinder 32 serves to back-drive the drive shaft 42 of the ball nut and screw assembly 40. The rotational driving movement of the shaft 42 is transmitted through a suitable reduction gear train 64 for correspondingly back-driving an output shaft 66 of an electric drive motor 68. When the motor output shaft 66 is free to rotate, as will be described in more detail, such back-driving of the motor 68 consumes minimal power and thus does not interfere with hydraulic powered operation of the actuator 16 for displacing the outboard wing section 14. Importantly, the drive motor 68 can be electrically driven to rotate its output shaft 66, resulting in corresponding rotation of the drive shaft 42 via the reduction gear train 64 to achieve longitudinal displacement of the power piston 52 and ram 30 within the power cylinder 32. That is, the electric motor 68 provides an alternative and reversible electric drive power source for operating the actuator 16.

Based on the foregoing it should be clear what reacts the torque when the ball screw is electrically driven or when the motor brake is applied. Rotation of the piston 52, the ram 30 and ball nut 48 is prevented by lugs on the rodend assembly on the output end of the ram. These lugs engage suitable surfaces on the mating links and react the loads to airframe structure. Likewise torque generated in the cylinder barrel structure is reacted on lugs of rodend 34 via aircraft structure.

An electrohydraulic brake unit 70 is associated with an aft end 66' of the motor output shaft 66 to prevent actuator operation in the absence of hydraulic or electrical power drive input. By preventing actuator operation, extension or retraction of the ram 30 is effectively precluded to correspondingly lock the outboard wing section 14 in place. With this construction, any interruption of input drive power to the actuator 16 results in automatic lock-up of the actuator 16 to retain the folding wing section 14 in place. Uncontrolled dropping of the wing section, which might otherwise occur upon power interruption with the wing section in a folded or partially folded condition, is thus prevented.

Figure 6:
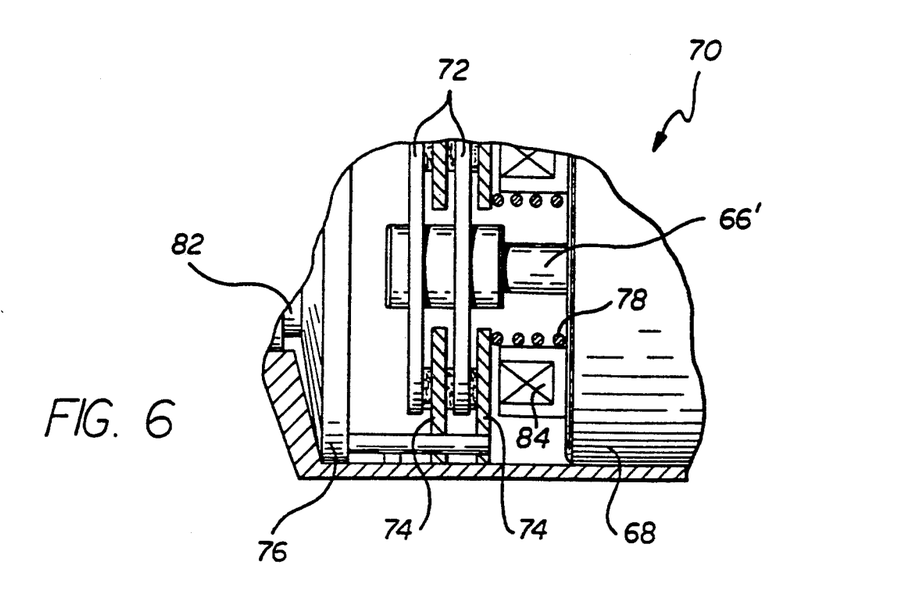
FIG. 6 is an enlarged fragmented sectional view corresponding generally with the encircled region 6 of FIG. 5, but depicting the brake unit in an engaged condition.

The brake unit 70 includes at least one and preferably multiple brake disks 72 carried on the aft end 66' of the motor output shaft 66 for rotation therewith. These brake disks 72 are disposed in association with a corresponding number of friction rings 74 carried on an axially movable but nonrotating brake arbor 76. A spring 78 reacts between a motor housing and the arbor 76 for displacing the friction rings 74 into normal brake engagement with the brake disks 72 (FIG. 6).

When the actuator 16 is hydraulically operated by supplying pressurized hydraulic fluid to one of the cylinder chambers 54 or 56, the pressurized hydraulic fluid is correspondingly supplied to one side of an associated brake piston 80 or 82. More particularly, supply of hydraulic fluid under pressure through the conduit 58 to the cylinder chamber 54 is accompanied by hydraulic fluid supply through a branch conduit 581 to a brake cylinder chamber at one end of the brake spool or piston 80. Conversely, hydraulic fluid supply through the conduit 60 to the other cylinder chamber 56 is accompanied by fluid delivery through a branch conduit 60' to an annular brake cylinder chamber at one side of a land defining the second brake piston 82. In either case, the pressurized hydraulic fluid within the brake cylinder chambers applies hydraulic pressure to the brake piston 80 or 82 to displace the brake arbor 76 against the spring 78 for purposes of releasing the brake disks 72, as shown in FIG. 5. Alternatively, in response to electrical operation of the drive motor 68, an electromagnet 84 retracts the arbor 76 for releasing the brake disks 72. In either case, upon power drive operation of the actuator 16, hydraulically or electrically, the brake unit 70 is released. If the hydraulic or electric power drive input is interrupted for any reason, the hydraulic pressure applied to the brake piston 80 or 82, or the electromagnetic action of the magnet 84, is also interrupted. As a result, the brake arbor 76 is automatically released for spring-loaded reengagement of the friction rings 74 with the brake disks 72 (FIG. 6).

Figure 7:
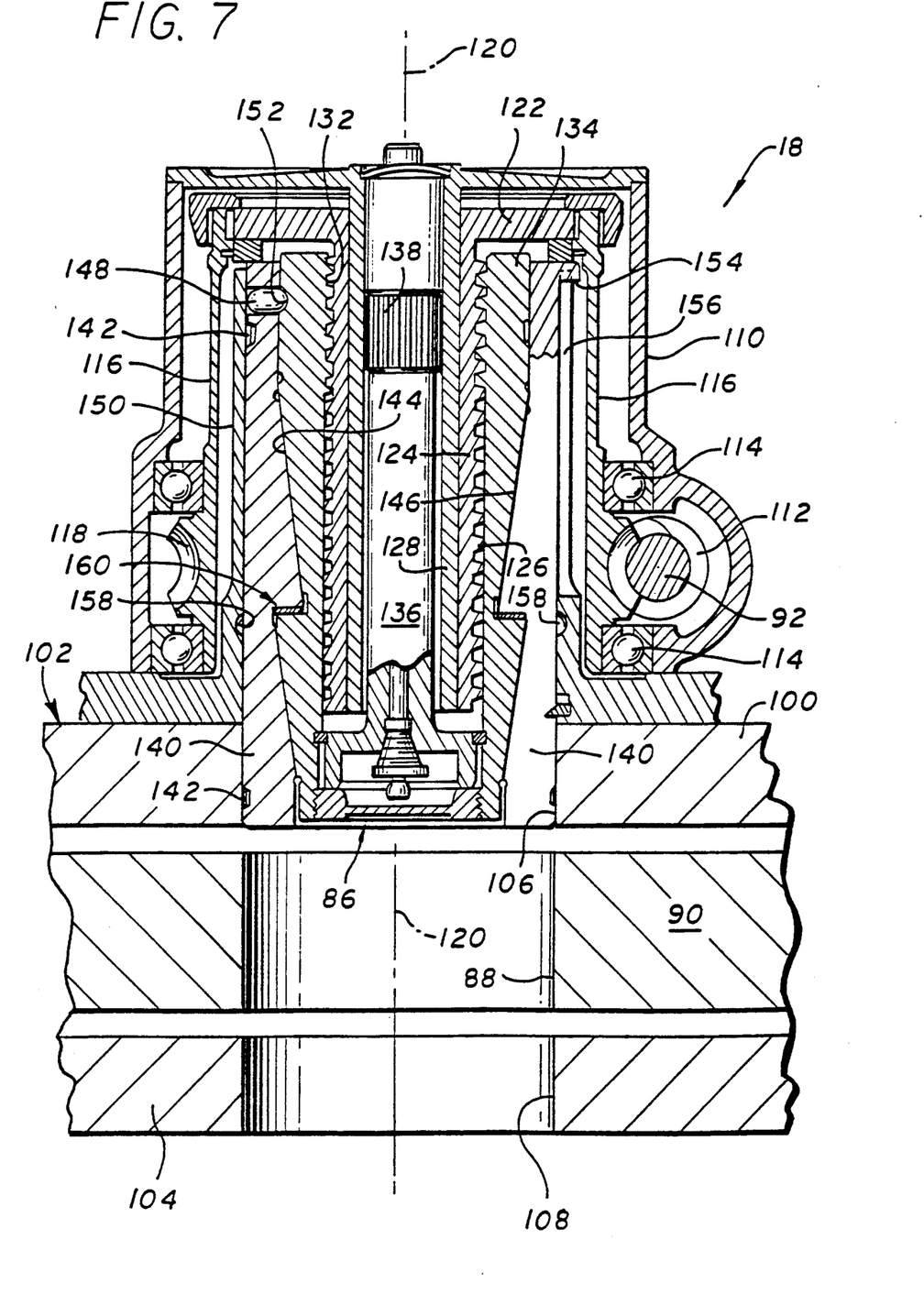
FIG. 7 is an enlarged fragmented vertical sectional view depicting a preferred form of a latch pin unit for locking the outboard wing section in the deployed position, and illustrating a latch pin in a retracted position.

The actuator system 12 additionally includes the latch pin units 18 for securely locking the outboard wing section 14 in the deployed condition for safe flight operations. In this regard, FIG. 2 illustrates a total of eight latch pin units at spaced fore-aft positions along the width of the aircraft wing. Each latch pin unit 18 is physically mounted on one of the adjacent wing sections 14 or 22, and includes an extensible latch pin 86 for retractable extension into a lock port 88 formed in a lock tongue 90 on the inboard wing section 22 (FIG. 7). The specific number of latch pin units 18 will vary in accordance with the wing spar construction and loading requirements. However, as viewed in FIG. 2, all of the latch pin units 18 are associated with a common cross shaft 92 which may be driven by an electric motor 94 or an hydraulic actuator 96, all under the regulation of the control valve 62. A shaft counter 98 may be mounted at one end of the cross shaft 92 to provide feedback data indicative of the positioning of the latch pins.

Figure 8:
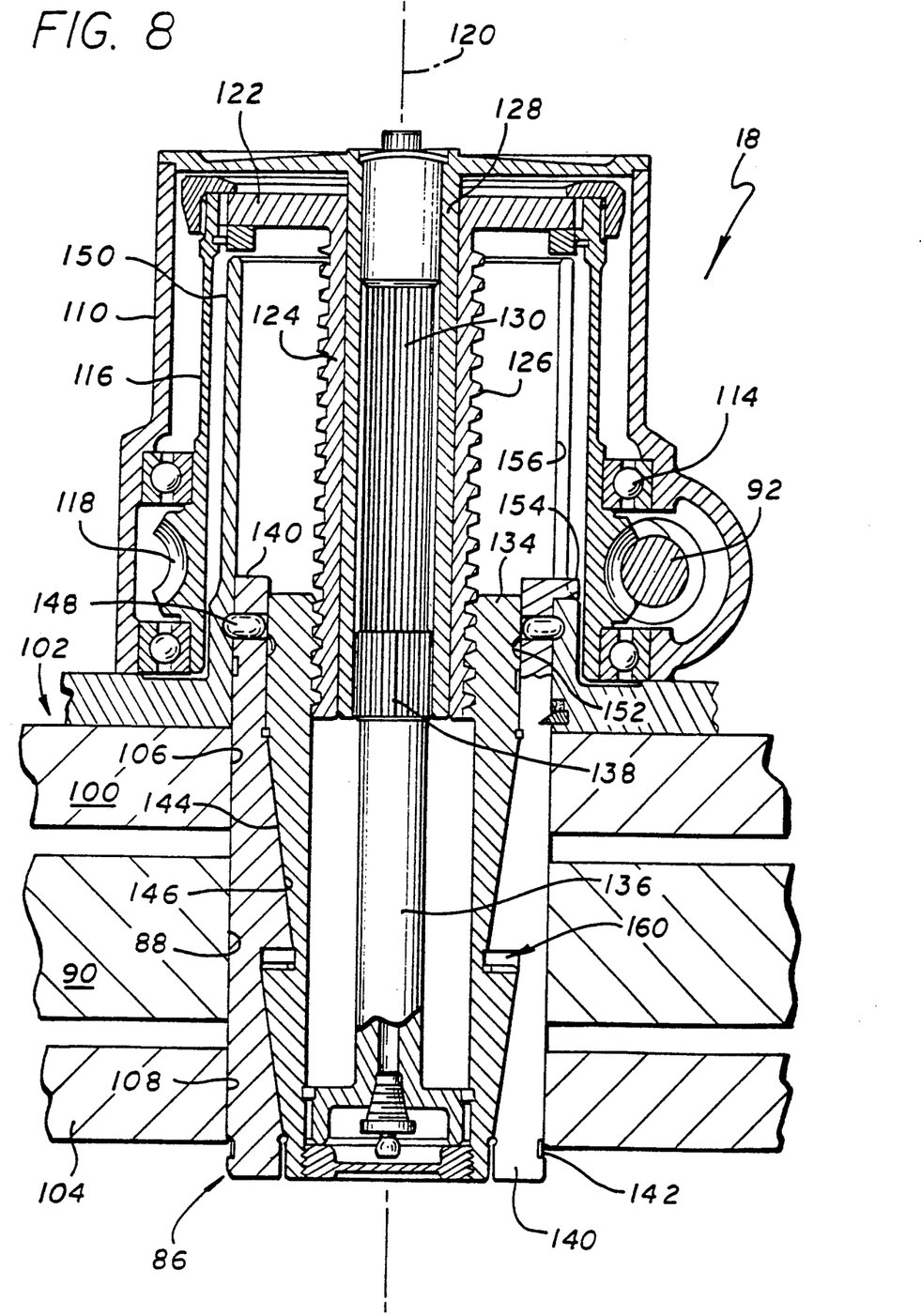
FIG. 8 is an enlarged fragmented vertical sectional view similar to FIG. 7, but depicting the latch pin in an extended position.

A preferred latch pin unit 18 is shown in FIGS. 7 and 8, wherein the latch pin unit is mounted on the upper bracket arm 100 of a clevis 102 on the outboard wing section 14. The clevis 102 is defined by the upper bracket arm 100 disposed in spaced relation above a lower bracket arm 104, with the two bracket arms 100 and 104 having aligned lock ports 106 and 108 formed respectively therein for receiving the extensible latch pin 86. Importantly, when the folding wing section 14 is in the deployed position, a lock tongue comprising the structural component 90 on the inboard wing section 22 projects into the clevis space. This lock tongue 90 defines the additional lock port 88 in substantial vertical alignment with the clevis ports 106 and 108, whereby passage of the latch pin 86 through the aligned lock ports functions to securely lock the outboard wing section 14 in the deployed position.

The illustrative latch pin unit 18 includes an inverted and generally cup-shaped casing 110 mounted in a fixed position on the upper bracket arm of the clevis 102. One side of the casing 110 includes an expanded lobe to accommodate passage of the cross shaft 92 which includes a rotatably driven worm gear 112 within the casing 110. Ring bearings 114 support a driven cylinder 116 within the casing 110, wherein this driven cylinder 116 includes an external surface defining an annular driven worm gear 118 engaged with the worm gear 112 on the cross shaft 92. Accordingly, rotational driving of the cross shaft 92 effectively rotates the driven cylinder 116 about a central axis 120 of the driven cylinder, wherein this central axis corresponds with a central axis of the latch pin 86, as will be described.

An upper end of the driven cylinder 116 carries an end plate 122 which is joined in turn to a downwardly projecting tubular drive shaft 124 having an external thread 126 formed thereon. This drive shaft 124 is disposed coaxially about a nonrotational spline tube 128 supported from one end of the casing 110 and defining a longitudinally extending internal spline 130 (FIG. 8).

The external thread 126 on the drive shaft 124 is engaged with an internal thread segment 132 formed generally at an upper end of an inner pin sleeve 134. As shown in FIG. 7, this inner pin sleeve 134 comprises an integral portion of the latch pin 86 and, in the retracted position, is disposed generally within the casing 110. The inner pin sleeve 134 has a lower or nose end which projects at least a short distance beyond the lowermost ends of the drive shaft 124 and the spline tube 128, whereat the inner pin sleeve 134 is connected to a spline shaft 136 which projects into the spline tube 128 and includes a spline collar 138 engaged with the spline 130 therein.

A plurality of outer pin segments 140 are mounted about and carried with the inner pin sleeve 134. These outer pin segments 140 each have a part-circular shape and collectively define a generally circular structure mounted concentrically about the inner pin sleeve 134. At least one spring member 142 is provided for normally biasing the pin segments 140 in a radially inward direction in bearing engagement with the inner pin sleeve 134.

In accordance with one primary aspect of the latch pin unit 18, the inner pin sleeve 134 cooperates with the outer pin segments 140 to define a ramped interface which causes the effective diameter of the latch pin 86 to expand as the latch pin is extended through the aligned lock ports 88 and 108, and thereby securely lock the outer wing section 14 in the deployed position for normal flight operations. More particularly, as shown in FIG. 7, the inner sleeve 134 of the latch pin defines at least one and preferably two ramped surfaces 144 which extend downwardly and radially inwardly toward the central sleeve axis 120. These ramped surfaces 144 on the inner sleeve 134 are matingly engaged with oppositely ramped surfaces 146 on the outer pin segments 140, when the latch pin 86 is fully retracted (FIG. 7). In the fully retracted position, detent balls 148 carried within radially open ports in the outer pin segments 140 are forced by a fixed outer guide sleeve 150 into registry with aligned detents or recesses 152 in the inner sleeve 134. With this construction, when the drive shaft 124 is rotatably driven by the cross shaft 92 and associated worm gear 112, the nonrotational connection of the spline shaft 136 with the spline tube 128 causes the inner pin sleeve 134 to be longitudinally translated for extension of the latch pin through the underlying and aligned lock ports. This downward translation of the inner pin sleeve 134 is accompanied by a concurrent downward translation of the outer pin segments 140, as a result of reception of the detent balls 148 within the pin recesses 152.

As the latch pin is extended, a guide tab 154 on at least one of the outer pin segments 140 rides within a longitudinal slot 156 in the adjacent guide sleeve 150. As the latch pin nears a fully extended position, the guide tab 154 contacts a lowermost end of the slot 156. At substantially the same time, the detent balls 148 reach a position of alignment with outer detents or recesses 158 in the guide sleeve 150, thereby permitting outward detent ball displacement and resultant disengagement of the outer pin segments 140 from the inner pin sleeve 134. With this construction, further downward or extended movement of the outer pin segments 140 is prevented, whereas further downward translation of the inner pin sleeve 134 to a fully extended position is permitted. Such downward motion of the inner pin sleeve continues by further driving of the threaded drive shaft 124, with the result that the inner ramped surfaces 144 slide against the opposing outer ramped surfaces 146 to achieve radial expansion of the outer pin segments 140 sufficient to fit tightly within the lock port 88, as viewed in FIG. 8.

Accordingly, the latch pin 86 of the latch pin unit 18 is extended through the aligned lock ports by rotary drive operation of the cross shaft 92 (FIG. 2). During the major portion of the latch pin extension movement, the latch pin has a slightly reduced or collapsed diametric size to facilitate pin registry within the lock ports, substantially without binding which might otherwise occur as a result of slight component misalignment. During a final minor portion of the latch pin extension stroke to a fully extended position, the effective diameter is expanded for tightly fitting within the underlying lock ports, thereby providing a safe and secure wing section connection.

Reverse rotation of the cross shaft 92 functions to retract the latch pin 86, thereby unlocking the outer wing section 14 for subsequent folding movement to the stored position, if desired. More particularly, initial retraction movement of the inner pin sleeve 134 in response to reverse rotation of the drive shaft 124 permits spring-loaded radial compression of the outer pin segments 140. Moreover, The detent recesses 152 on the inner sleeve 134 are displaced into alignment with the detent balls 148 to reengage the inner and outer pin components for longitudinal movement together. Abutting shoulders referend by arrow 160 are desirably provided to insure upward displacement of the outer pin segments 140 with the inner pin sleeve 134, and corresponding detent ball disengagement from the outer guide sleeve 150.

Figure 9:
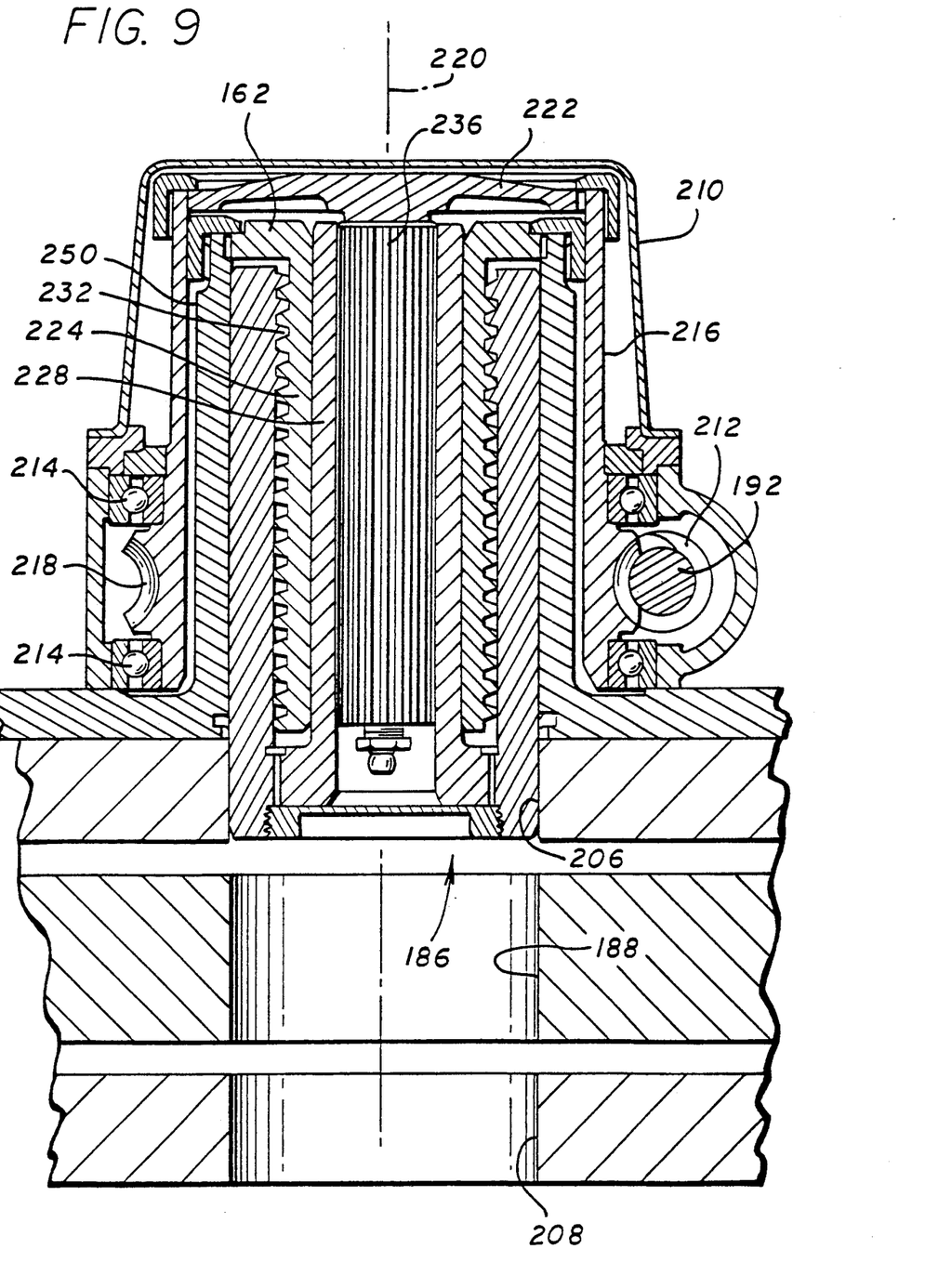
FIG. 9 is an enlarged fragmented vertical sectional view similar to FIG. 7, and illustrating one alternative preferred form of a latch pin unit with a latch pin in a retracted position.
Figure 10:
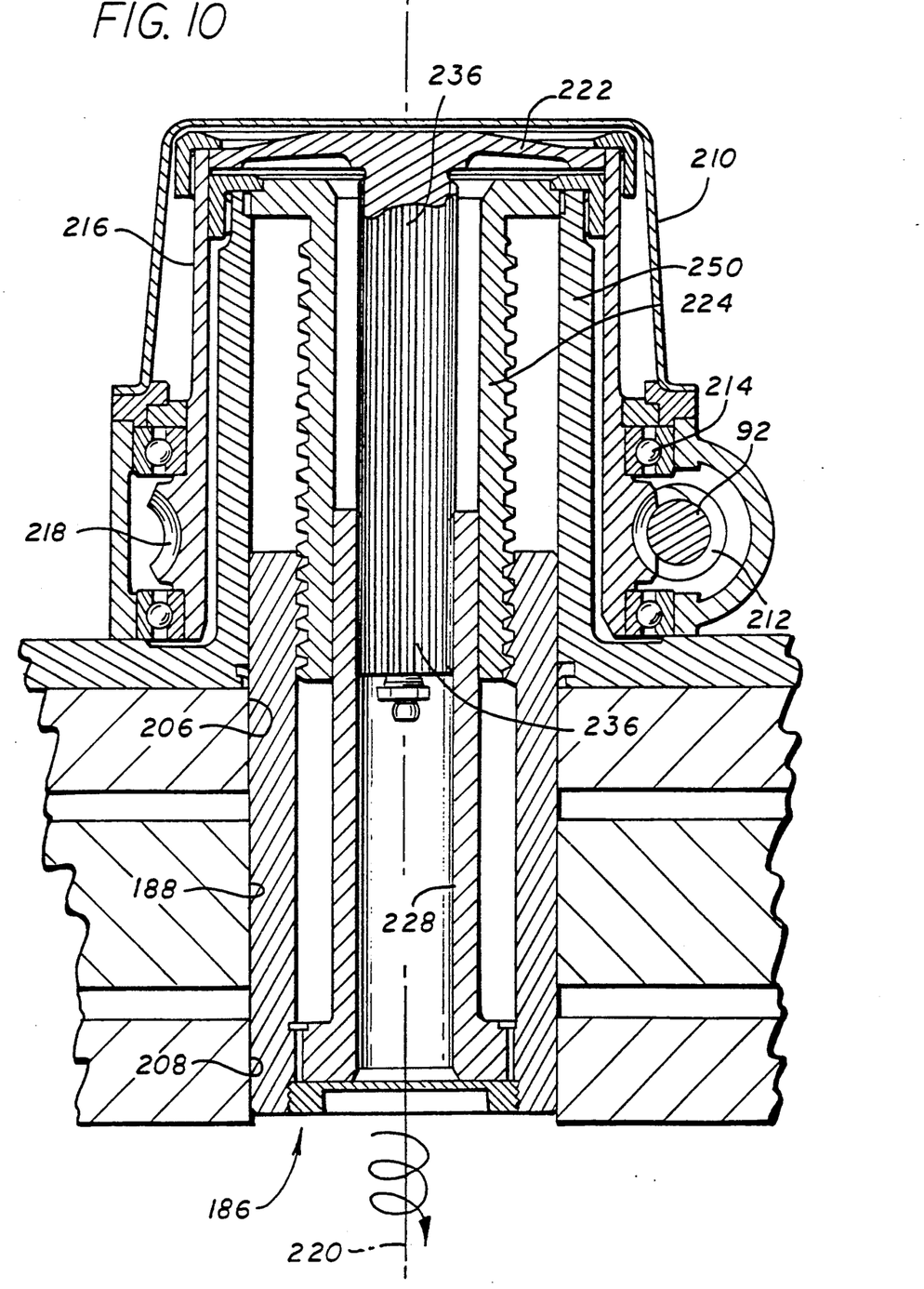
FIG. 10 is an enlarged fragmented vertical sectional view similar to FIG. 9, and illustrating the latch pin in an extended position.

An alternative latch pin geometry is shown in FIGS. 9 and 10, wherein components generally common in structure or function with the embodiment of FIGS. 7 and 8 are identified by the common reference numerals increased by one hundred. In this alternative embodiment (FIGS. 9 and 10), a modified latch pin 186 is adapted for rotational movement in the course of longitudinal translation for purposes of facilitating latch pin engagement and disengagement with respect to underlying lock ports 206, 188 and 208.

More particularly, as shown in FIGS. 9 and 10, the modified latch pin unit again includes an inverted, generally cup shaped casing 210 adapted to receive the worm gear 212 disposed along the length of the cross shaft 192. A set of ring bearings 214 rotatably support a driven cylinder 216 within the casing 210, wherein the driven cylinder again includes an annular external driven worm gear 218 in meshed relation with the worm gear 212 on the cross shaft 192. The driven cylinder 216 drives an end plate 222 which, in this embodiment, coaxially drives a downwardly projecting spline shaft 236 having an externally formed longitudinal spline thereon.

An internal fixed support or guide sleeve 250 within the casing 210 forms a cylindrical guide structure for the extensible latch pin 186. In addition, the guide sleeve 250 is connected at an upper end to an end flange 162 joined to a downwardly projecting, externally threaded sleeve shaft 224. As in the previous embodiment, the sleeve shaft 224 is meshed with an internal threaded segment 232 adjacent an upper end of the latch pin 186. In this regard, the latch pin has a generally cylindrical shape which fits into the annular space between the threaded sleeve shaft 224 and the guide sleeve 250. In addition, a lower or nose end of the latch pin 186 carries a cylindrical spline tube 228 having an internal spline meshed with the spline shaft 236.

When the cross shaft 192 and its associated worm gear 212 are rotated, the spline connection between the rotating spline shaft 236 and the spline tube 228 causes the latch pin 186 to be rotatably driven. At the same time, the threaded connection between the latch pin and the fixed threaded sleeve shaft 224 causes the latch pin 182 to translate longitudinally. This combination of longitudinal and rotational translation extends the latch pin 186 for insertion into the underlying lock ports (FIG. 10) with a combination of longitudinal translation and rotational twisting action relative to a central latch pin axis 220. Conversely, retraction of the latch pin in a longitudinal direction is accompanied by a twisting action as the latch pin is rotated. The combination of longitudinal and rotational movement has been found to be effective in obtaining positive and reliable latch pin operation without frictional binding or sticking. Accordingly, the outboard wing section can be safely and positively locked and unlocked.

The improved actuator system of the present invention thus provides for safe and reliable wing fold operation in response to alternative electrical or hydraulic power drive inputs, while effectively locking the folding wing section in place in the event of power supply interruption. Moreover, the actuator system provides an improved latch pin unit for safe and reliable locking of a folding wing section in the deployed position.

A variety of further modifications and improvements to the present invention will be apparent to those skilled in the art. Accordingly, no limitation on the invention is intended by way of the foregoing description or accompanying drawings, except as set forth in the appended claims.

What is claimed is:

1. A wing fold actuator system for use in an aircraft having an outboard wing section connected to an inboard wing section for movement between a deployed position and a folded position said actuator system comprising:

an electrohydraulic actuator connected between the inboard and outboard wing sections, said electrohydraulic actuator including a driven member for displacing the outboard wing section between the deployed and folded positions;

said electrohydraulic actuator includes a power cylinder having a base end connected to one of the inboard and outboard wing sections, and a ram adapted for extension and retraction movement with respect to said power cylinder and having a free end connected to the other at the inboard and outboard wing sections;

said electrohydraulic actuator further including hydraulic drive means and electric motor drive means alternatively operable for reversible power drive displacement of said driven member, said electric motor drive means including a rotatable output shaft connected to said driven member, said output shaft being rotatably back-driven by said driven member upon operation of said hydraulic drive means to displace said driven member; and said hydraulic drive means includes a power piston connected to said ram and mounted within power cylinder, said power piston cooperating with said power cylinder to define a pair of fluid chambers at opposite sides of said power piston, and means for controllably supplying hydraulic fluid under pressure to one of said chambers while exhausting the other of said chambers to displace said power piston within said power cylinder;

said actuator further includes a central drive shaft, and reversible transmission means for rotating said drive shaft in response to displacement of said power piston within said power cylinder, said output shaft of said electric motor drive means being connected to said drive shaft for rotation therewith; and a brake unit for preventing displacement of said driven member upon interruption of power drive displacement thereof, said brake unit including a brake member carried on said output shaft for rotation therewith, a friction member, means for engaging said brake and friction members to prevent rotation of said output shaft in the absence of operation of one of said drive means, and means for disengaging said brake and friction members to permit rotation of said output shaft during operation of one of said drive means for power drive displacement of said drive member.

2. The wing fold actuator system of claim 1 wherein said transmission means comprises a ball nut and screw assembly.

3. The wing fold actuator system of claim 1 wherein said electric motor drive means comprises a reduction gear train connected between said drive shaft and said output shaft.

4. The wing fold actuator system of claim 1 wherein said brake member comprises a brake disk.

5. The wing fold actuator system of claim 1 wherein said means for engaging said brake and friction members comprises a nonrotational arbor having said friction member mounted thereon and adapted for movement between a first position with said brake and friction members engaged and a second position with said brake and friction members disengaged, and spring means for biasing said arbor toward said first position.

6. The wing fold actuator system of claim 5 wherein said means for disengaging said brake and friction means comprises a brake piston connected to said arbor and means for applying hydraulic fluid under pressure to said brake piston during operation of said hydraulic drive means to displace said arbor to said second position, and electromagnetic means for displacing said arbor to said second position during operation of said electric motor drive means.

7. A wing fold actuator system for use in an aircraft having an outboard wing section with a latch pin unit for releasably locking the outboard wing section to an inboard wing section said actuator system comprising:
an electrohydraulic actuator connected between the inboard and outboard wing sections, said electrohydraulic actuator including a driven member for displacing the outboard wing section between the deployed and folded positions;
said electrohydraulic actuator further including hydraulic drive means and electric motor drive means alternatively operable for reversible power drive displacement of said driven member, said electric motor drive means including a rotatable output shaft connected to said driven member, said output shaft being rotatable back-driven by said driven member upon operation of said hydraulic drive means to displace said driven member;
a brake unit for preventing displacement of said driven member upon interruption of power drive displacement thereof, said brake unit including a brake member carried on said output shaft for rotation therewith, a friction member, means for engaging said brake and friction members to prevent rotation of said output shaft in the absence of operation of one of said drive members, and means for disengaging said brake and friction members to permit rotation of said output shaft during operation of one of said drive members for power drive displacement of said drive member; and
wherein said latch pin unit includes an extensible latch pin, and further including electrohydraulic means for displacing said latch pin between extended and retracted positions.

8. A wing fold actuator system for use in an aircraft having an outboard wing section with a latch pin unit for releasably locking the outboard wing section to an inboard wing section said actuator system comprising:
an electrohydraulic actuator connected between the inboard and outboard wing sections, said electrohydraulic actuator including a driven member for displacing the outboard wing section between the deployed and folded positions;
said electrohydraulic actuator further including hydraulic drive means and electric motor drive means alternatively operable for reversible power drive displacement of said driven member, said electric motor drive means including a rotatable output shaft connected to said driven member, said output shaft being rotatable back-driven by said driven member upon operation of said hydraulic drive means to displace said driven member;
a brake unit for preventing displacement of said driven member upon interruption of power drive displacement thereof, said brake unit including a brake member carried on said output shaft for rotation therewith, a friction member, means for engaging said brake and friction members to prevent rotation of said output shaft in the absence of operation of one of said drive members, and means for disengaging said brake and friction members to permit rotation of said output shaft during operation of one of said drive members for power drive displacement of said drive member; and
wherein said latch pin unit includes a latch pin movable along a longitudinal axis of said pin between extended and retracted positions, and means for rotating said latch pin about said axis during movement between said extended and retracted positions.

9. A wing fold actuator system for use in an aircraft having an outboard wing section connected to an inboard wing section for folding movement between a deployed position and a folded position, said actuator system comprising:
an hydraulic power cylinder connected to one of the inboard and outboard wing sections;
a power piston mounted within said power cylinder;
a ram carried by said power piston and projecting from said power cylinder and being connected to the other of said inboard and outboard wing sections;
an electric drive motor having a rotatable output shaft;
transmission means connected between said power piston and said output shaft for reversibly driving said output shaft in response to translation of said power piston within said power cylinder;
a brake member carried on said output shaft for rotation therewith;
a nonrotational friction member;
spring means for normally displacing said friction member into braking engagement with said brake member to normally prevent rotation of said output shaft and thereby also prevent translation of said power piston within said power cylinder;
hydraulic drive means for supplying hydraulic fluid under pressure to said power cylinder for translating said power piston therein, said hydraulic drive means including hydraulic brake release means for displacing said friction member out of braking engagement with said brake member during supply of the hydraulic fluid under pressure to said power cylinder, thereby permitting rotation of said output shaft; and
electric drive means for driving said electric motor to rotatably drive said output shaft and thereby translate said power piston within said power cylinder, said electric drive means including electric brake release means for displacing said friction member out of braking engagement with said brake member during driving operation of said electric motor thereby permitting rotation of said output shaft;
said hydraulic and electric brake release means permitting spring-loaded re-engagement of said brake and friction members upon respective operational interruption of said hydraulic and electric drive means.

10. The wing fold actuator system of claim 9 wherein said transmission means comprises a ball nut and screw assembly.

11. The wing fold actuator system of claim 10 wherein said transmission means further includes a reduction gear train.

12. The wing fold actuator system of claim 9 further including at least one latch pin unit for releasibly locking the outboard wing member in the deployed position.

13. The wing fold actuator system of claim 12 wherein said latch pin unit includes a latch pin movable between extended and retracted positions, said latch pin including means for expanding the cross sectional size of said latch pin upon movement thereof to said extended position.

14. The wing fold actuator system of claim 12 wherein said latch pin unit includes a latch pin movable along a longitudinal axis of said pin between extended and retracted positions, and means for rotating said latch pin about said axis during movement between said extended and retracted positions.

* * * * *